US012636800B2

(12) United States Patent
Onodera et al.

(10) Patent No.: US 12,636,800 B2
(45) Date of Patent: May 26, 2026

(54) DAMAGE-POINT ESTIMATION DEVICE AND DAMAGE-POINT ESTIMATION METHOD

(71) Applicant: FANUC CORPORATION, Yamanashi (JP)

(72) Inventors: Yuusei Onodera, Yamanashi (JP); Shun Suyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 237 days.

(21) Appl. No.: 18/254,212

(22) PCT Filed: Dec. 14, 2021

(86) PCT No.: PCT/JP2021/046107
§ 371 (c)(1),
(2) Date: May 24, 2023

(87) PCT Pub. No.: WO2022/131267
PCT Pub. Date: Jun. 23, 2022

(65) Prior Publication Data
US 2024/0025061 A1     Jan. 25, 2024

(30) Foreign Application Priority Data
Dec. 16, 2020     (JP) ................................. 2020-208560

(51) Int. Cl.
*B25J 19/06* (2006.01)
*B25J 9/16* (2006.01)

(52) U.S. Cl.
CPC ..................................... *B25J 19/06* (2013.01)

(58) Field of Classification Search
None
See application file for complete search history.

(56) References Cited

U.S. PATENT DOCUMENTS 10,920,825 B2 * 2/2021 Asano ..................... F16C 41/00
2008/0140321 A1 * 6/2008 Blanc .................... B25J 9/1674
                                                      702/41

FOREIGN PATENT DOCUMENTS

CN       111739063 A  * 10/2020 ............ B25J 9/1697
JP       2012-013469 A      1/2012
                (Continued)

OTHER PUBLICATIONS

English machine translation of CN111739063A (Year: 2017).*
International Search Report issued in PCT/JP2021/046107; mailed Mar. 1, 2022.

*Primary Examiner* — Jason Holloway
*Assistant Examiner* — Atticus A Cameron
(74) *Attorney, Agent, or Firm* — Studebaker Brackett PLLC

(57) ABSTRACT

The purpose of the present invention is to provide a damage-point estimation device that is capable of more accurately extracting points susceptible to damage in a linear-motion guide mechanism for a robot. A damage-point estimation device 30 comprises: a data acquisition unit 31 that acquires physical parameters concerning the motion of a robot 10 with respect to individual axes and external forces acting on the robot 10 at individual times when an action program for the robot 10 is executed; an external-force and moment calculation unit 32 that calculates the external forces and moments acting on a reference position of a slide member at the individual times; a load calculation unit 33 that calculates the loads acting on a slider at the individual times; an equivalent load calculation unit 34 that calculates the equivalent loads of the slider at the individual times; an estimated-damage-value calculation unit 35 that calculates the estimated damage values of the slider at the individual times; and an estimated damage point extraction unit 36 that (Continued)

extracts an estimated damage point of the linear-motion guide mechanism.

11 Claims, 12 Drawing Sheets

(56)                 References Cited

FOREIGN PATENT DOCUMENTS

| JP | 2017-129519 A | 7/2017 |
| JP | 2021-066001 A | 4/2021 |

\* cited by examiner

Figure 11:
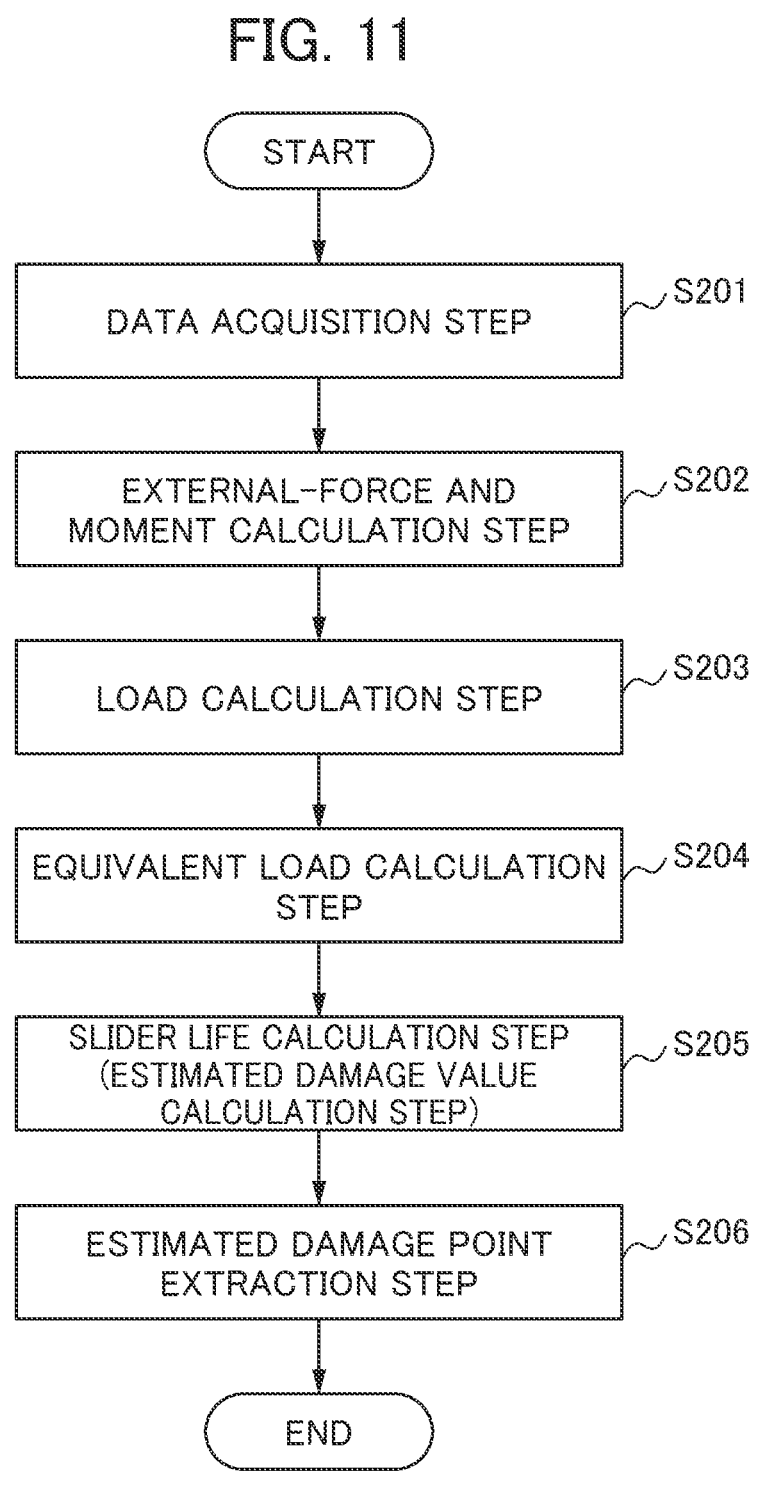

START

DATA ACQUISITION STEP ~ S201

EXTERNAL-FORCE AND MOMENT CALCULATION STEP ~ S202

LOAD CALCULATION STEP ~ S203

EQUIVALENT LOAD CALCULATION STEP ~ S204

SLIDER LIFE CALCULATION STEP (ESTIMATED DAMAGE VALUE CALCULATION STEP) ~ S205

ESTIMATED DAMAGE POINT EXTRACTION STEP ~ S206

END

DAMAGE-POINT ESTIMATION DEVICE AND DAMAGE-POINT ESTIMATION METHOD

TECHNICAL FIELD

The present invention relates to a damage-point estimation device and a damage-point estimation method.

BACKGROUND ART

Conventionally, as part of the inspection of a linear motion guide mechanism for a robot, the conditions of a slider, a guide rail, and grease are visually checked. However, a rolling surface and body of the slider are inside the linear motion guide mechanism, and for this reason, it is difficult to directly inspect these portions. A rolling surface of the guide rail is inspected instead of inspection of the rolling surface and body of the slider, but in this case, the guide rail needs to be inspected across the entire length thereof. For this reason, a great number of steps are necessary. Particularly, a general linear motion guide mechanism has rolling surfaces at four points. A portion which is not visible from above needs to be checked using, e.g., a mirror, and for this reason, this process takes time and effort. In a case where a slide member is provided on a slider, a rolling surface of a guide rail immediately below the slide member needs to be inspected while the slide member is moving together with the slider. For this reason, the number of steps is great.

A recovery method has been proposed, in which in a case where a linear motion guide mechanism included in a robot has broken down, the displacement of a linear motion bearing is measured, a load on the linear motion bearing is calculated based on the measured displacement, a linear motion bearing having stiffness against such a load is selected, and the broken linear motion bearing is replaced with the selected bearing (see, e.g., Patent Document 1).

Patent Document 1: Japanese Unexamined Patent Application, Publication No. 2012-13469

DISCLOSURE OF THE INVENTION

Problems to be Solved by the Invention

As a condition unique to an industrial robot, the position of the center of gravity might change due to a posture change or a load might change according to a movement pattern when the movement program is executed. For this reason, it is difficult to accurately calculate a load acting on a linear motion guide mechanism provided in the robot at a certain moment. The same also applies not only to the linear motion guide mechanism provided in the robot, but also to a linear motion guide mechanism provided on a tool of a robot and a linear motion guide mechanism cooperating with a robot. An object of the present invention is to provide a damage-point estimation device and a damage-point estimation method capable of more accurately extracting a point susceptible to damage in a linear motion guide mechanism for a robot.

Means for Solving the Problems

One aspect of the present disclosure is a damage-point estimation device for estimating a damage point of a linear motion guide mechanism for a robot, the linear motion guide mechanism including one or more sliders linearly movably provided on a guide rail and a slide member provided on the slider. The damage-point estimation device includes a data acquisition unit that acquires a physical parameter relating to movement of each axis of the robot and an external force acting on the robot at each time when a movement program for the robot is executed, an external-force and moment calculation unit that calculates an external force and a moment acting on a reference position of the slide member at each time based on the physical parameter relating to movement of each axis of the robot and acquired by the data acquisition unit, the external force acting on the robot and acquired by the data acquisition unit, and a geometric parameter, a load calculation unit that calculates a load acting on the slider at each time based on the external force and the moment calculated by the external-force and moment calculation unit and acting on the reference position and a distance from the reference position of the slide member to the position of the center of gravity of the slider, an equivalent load calculation unit that calculates an equivalent load on the slider at each time based on the load calculated by the load calculation unit and acting on the slider at each time and an equivalent load calculation formula, an estimated damage value calculation unit that calculates an estimated damage value of the slider at each time based on the equivalent load calculated on the slider at each time by the equivalent load calculation unit and a safety estimation element, and an estimated damage point extraction unit that extracts an estimated damage point of the linear motion guide mechanism based on the estimated damage value of the slider calculated at each time by the estimated damage value calculation unit and the position of the slider on the guide rail at each time.

Another aspect of the present disclosure is a damage-point estimation method for estimating an estimated damage point of a linear motion guide mechanism provided in a robot or a linear motion guide mechanism cooperating with the robot, a method of using a damage-point estimation device estimating a damage point of the linear motion guide mechanism for the robot, and the linear motion guide mechanism including one or more sliders linearly movably provided on a guide rail and a slide member provided on the slider. The damage-point estimation method includes a data acquisition step of acquiring a physical parameter relating to movement of each axis of the robot and an external force acting on the robot at each time when a movement program for the robot is executed, an external-force and moment calculation step of calculating an external force and a moment acting on a reference position of the slide member at each time based on the physical parameter relating to movement of each axis of the robot and acquired in the data acquisition step, the external force acting on the robot and acquired in the data acquisition step, and a geometric parameter, a load calculation step of calculating a load acting on the slider at each time based on the external force and the moment calculated in the external-force and moment calculation step and acting on the reference position and a distance from the reference position of the slide member to the position of the center of gravity of the slider, an equivalent load calculation step of calculating an equivalent load on the slider at each time based on the load calculated in the load calculation step and acting on the slider at each time and an equivalent load calculation formula, an estimated damage value calculation step of calculating an estimated damage value of the slider at each time based on the equivalent load calculated on the slider at each time in the equivalent load calculation step and a safety estimation element, and an estimated damage point extraction step of extracting the estimated damage point of the linear motion guide mechanism based on the estimated damage value of the slider calculated at each time in the estimated damage value calculation step and the position of the slider on the guide rail at each time.

Effects of the Invention

According to the damage-point estimation device and the damage-point estimation method of the present invention, the point susceptible to damage in the linear motion guide mechanism for the robot can be more accurately extracted.

BRIEF DESCRIPTION OF THE DRAWINGS

FIG. 1 is an entire configuration diagram of a robot system 1 of a first embodiment;

FIG. 11 is a flowchart showing steps of the processing of an estimated damage point extraction program executed in a damage-point estimation device 30A.

PREFERRED MODE FOR CARRYING OUT THE INVENTION

Figure 2A:
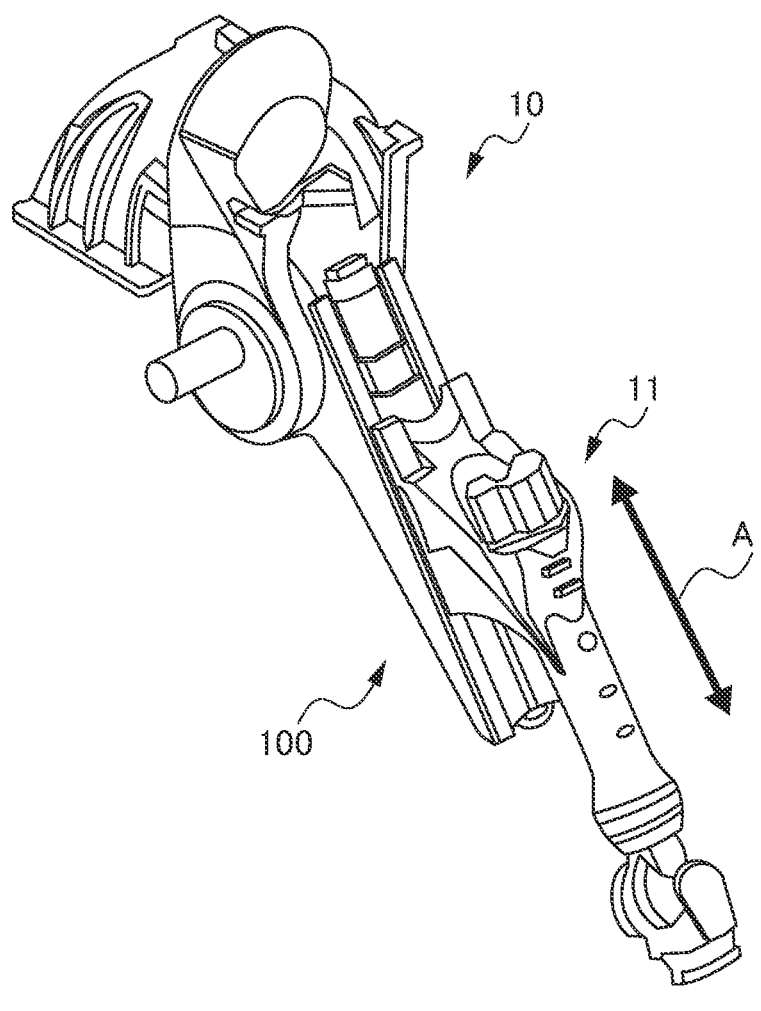
FIG. 2A is a schematic view showing a damage-point estimation device 30 provided in a robot 10.

Hereinafter, an embodiment of a damage-point estimation device and a damage-point estimation method according to the present invention will be described. Note that any of the drawings attached to the present specification shows a schematic view and the shape, scale, longitudinal-lateral dimensional ratio, etc. of each portion are changed or exaggerated as compared to actual shape, scale, longitudinal-lateral dimensional ratio, etc. for the sake of easy understanding of the drawings. Moreover, in the drawings, hatching showing the cross-section of a member is omitted where appropriate. In the present specification etc., terms specifying shapes, geometric conditions, and the degrees thereof, such as "parallel", "perpendicular", and "direction", include not only exact meanings of these terms, but also ranges taken as being substantially parallel, being substantially perpendicular, and being substantially in a direction.

First Embodiment

Figure 1:
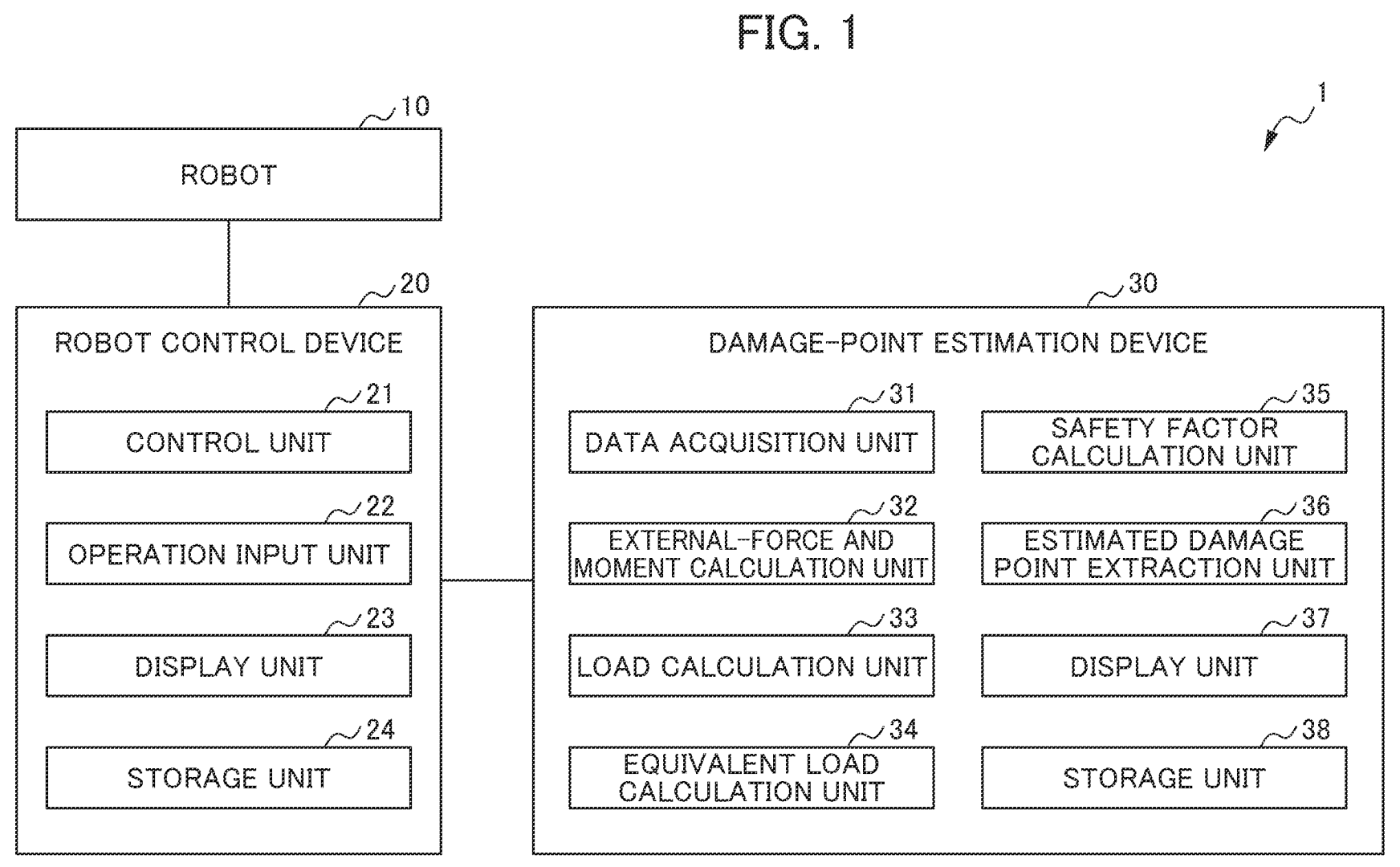
Figure 2B:
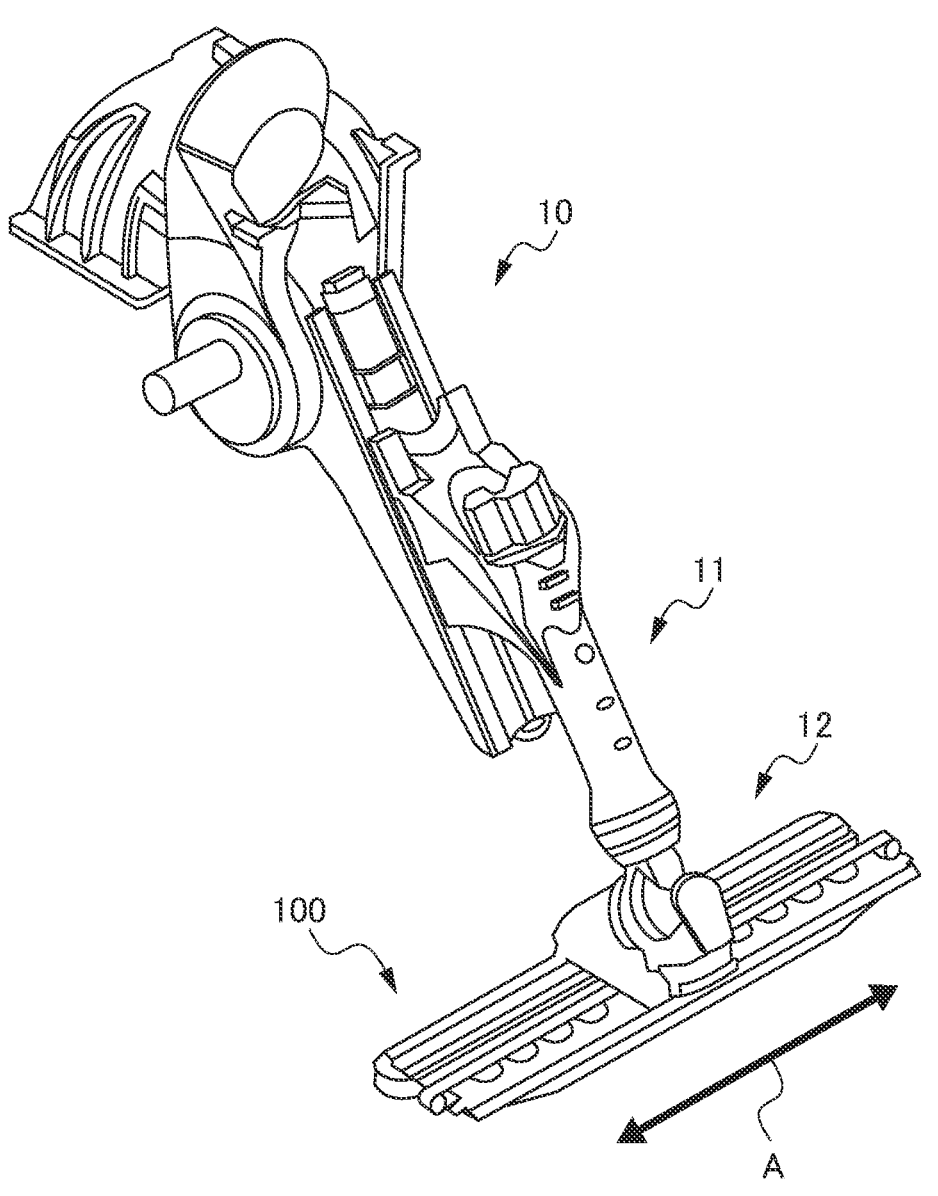
FIG. 2B is a schematic view showing the damage-point estimation device 30 provided in the robot 10.
Figure 2C:
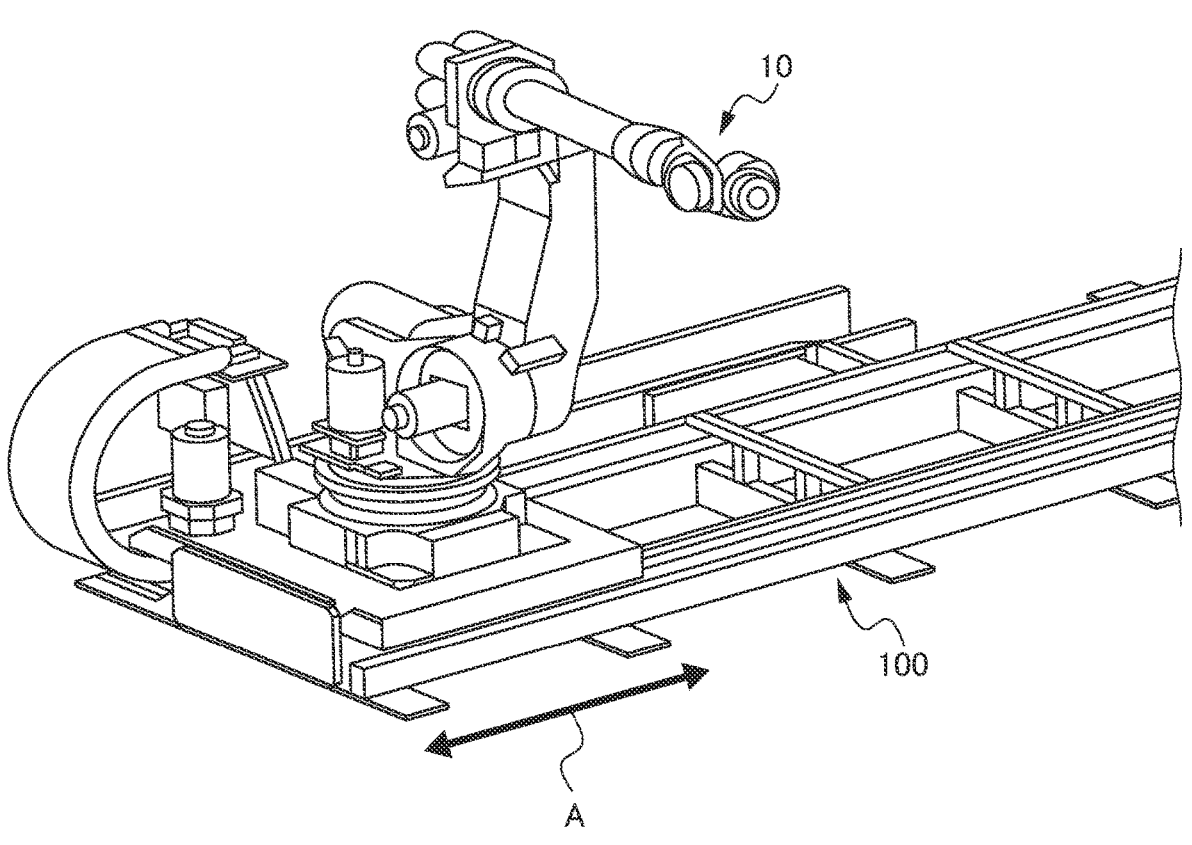
FIG. 2C is a schematic view of a linear motion guide mechanism 100 cooperating with the robot 10.
Figure 3:
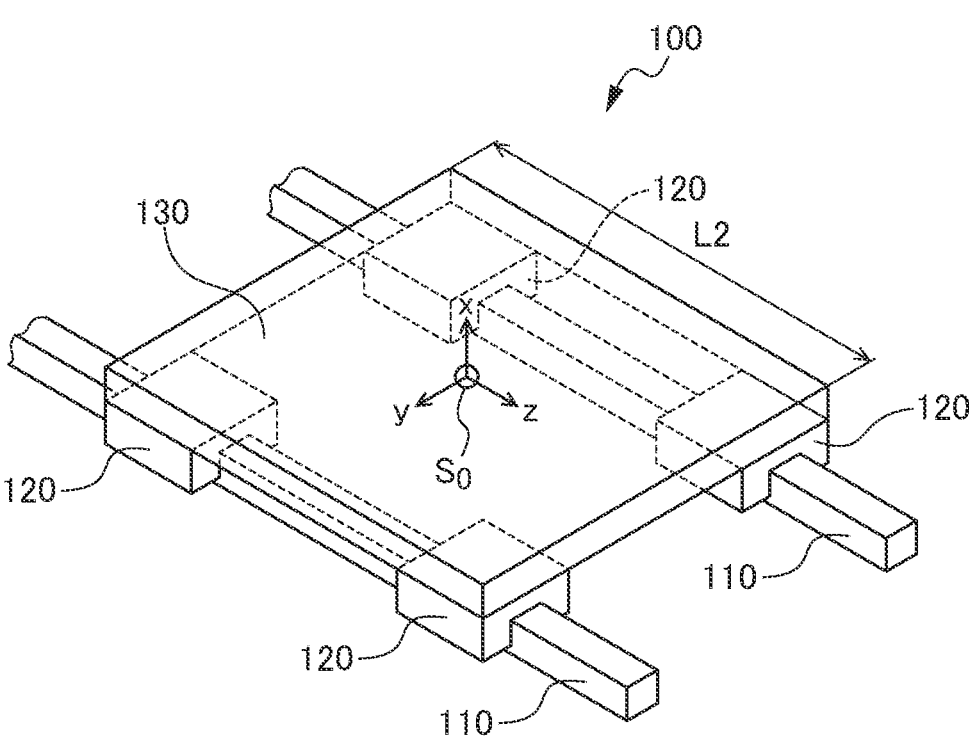
FIG. 3 is a perspective view showing a specific example of the linear motion guide mechanism 100.
Figure 4:
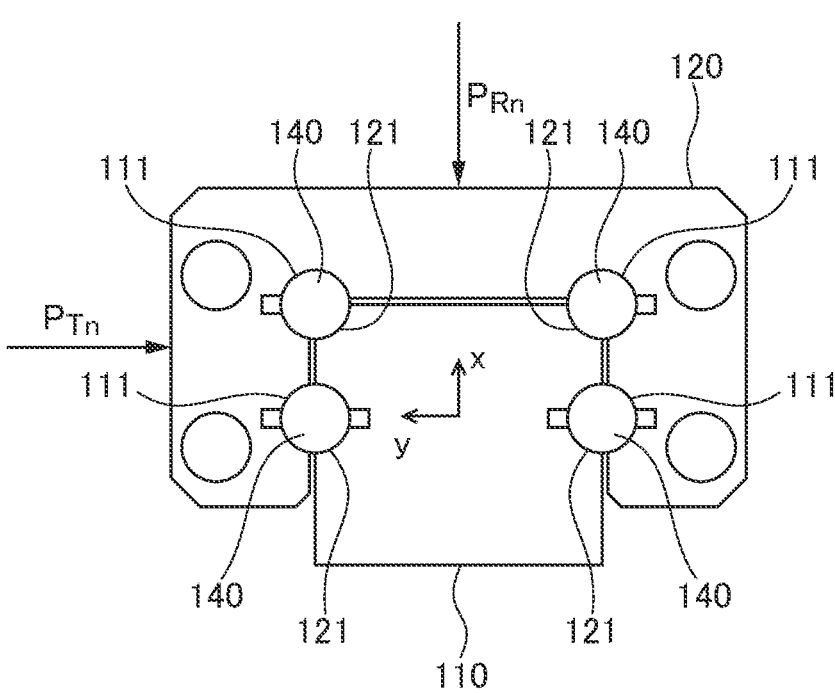
FIG. 4 is an x-y sectional view of a guide rail 110 and a slider 120 shown in FIG. 3.
Figure 5:
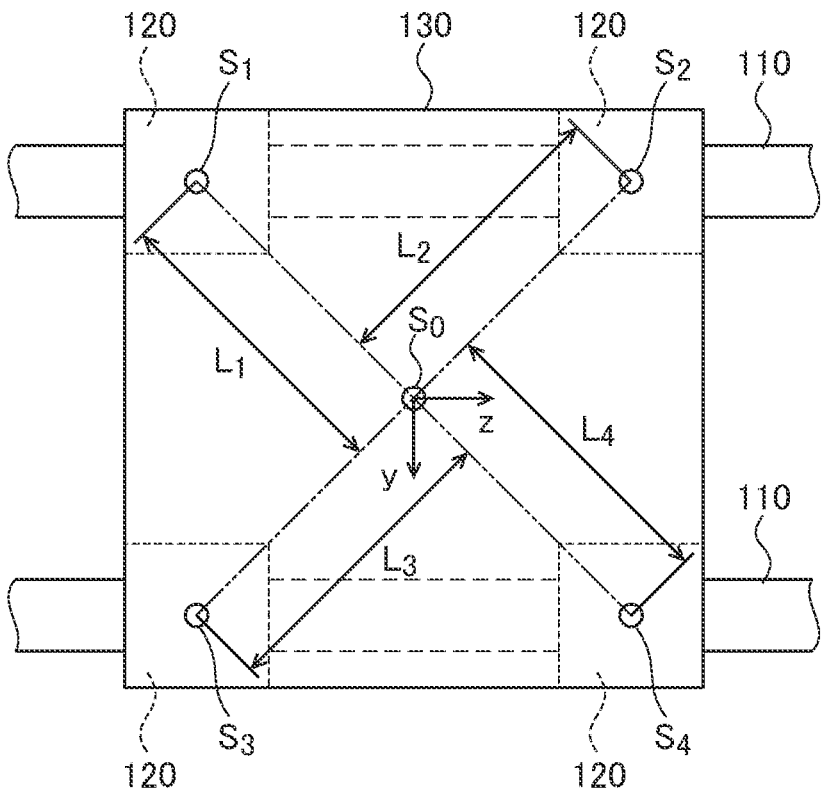
FIG. 5 is a plan view of the linear motion guide mechanism 100.

FIG. 1 is an entire configuration diagram of a robot system 1 of a first embodiment. FIGS. 2A and 2B are schematic views showing a damage-point estimation device 30 provided in a robot 10. FIG. 2C is a schematic view of a linear motion guide mechanism 100 cooperating with the robot 10. FIG. 3 is a perspective view showing a specific example of the linear motion guide mechanism 100. FIG. 4 is a x-y sectional view of a guide rail 110 and a slider 120 shown in FIG. 3. FIG. 5 is a plan view of the linear motion guide mechanism 100.

As shown in FIG. 1, the robot system 1 includes the robot 10, a robot control device 20, and the damage-point estimation device 30. In the robot system 1, the robot 10 and the robot control device 20 are electrically connected to each other via a signal cable (not shown), and the robot control device 20 and the damage-point estimation device 30 are electrically connected to each other via a signal cable (not shown). Note that the configurations of the robot 10 and the robot control device 20 in the first embodiment are the same as those of a robot system 1A of a later-described second embodiment.

(Robot 10)

The robot 10 is a device that performs a work, such as component handling, assembling, or welding, based on control by the robot control device 20 (described later). The robot 10 drives, based on a movement command transmitted from the robot control device 20, a servomotor (not shown) that moves each portion, thereby executing a movement pattern according to the above-described work. The robot 10 includes the linear motion guide mechanism 100 (described later). As shown in FIGS. 2A to 2C, the linear motion guide mechanism 100 is a device that linearly moves an arm 11 (FIG. 2A), a tool 12 (FIG. 2B), or the robot 10 (FIG. 2C) along the direction of the guide rail 110. As shown in FIGS. 2A to 2C, the linear motion guide mechanism 100 may be in a form in which the linear motion guide mechanism 100 is provided in the robot 10 or a form in which the linear motion guide mechanism 100 cooperates with the robot 10.

The linear motion guide mechanism 100 shown in FIG. 2A is provided in a body of the robot 10 to linearly move the arm 11. In the case of the form shown in FIG. 2A, each portion of the robot 10 moves like a pendulum, and therefore, a large portion of a load acting on the slider 120 (see FIG. 3) is due to the force of inertia when each portion of the robot 10 moves.

The linear motion guide mechanism 100 shown in FIG. 2B is provided on the tool 12 held on the arm 11 of the robot 10. In the case of the form shown in FIG. 2B, each portion of the robot 10 moves like a pendulum, and therefore, a large portion of a load acting on the slider 120 is due to the force of inertia when each portion of the robot 10 moves and a load due to the force of gravity (the weight of the tool 12).

The linear motion guide mechanism 100 shown in FIG. 2C is provided so as to cooperate with the robot 10 in a system using the robot 10. In the case of the form shown in FIG. 2C, a large portion of a load acting on the slider 120 is due to the force of gravity (the weight of the robot 10). Note that in the present specification, the systems using the robots 10 in the forms shown in FIGS. 2A and 2B and the system using the robot 10 in the form shown in FIG. 2C will also be collectively referred to as a "robot 10".

In FIGS. 2A to 2C, an arrow A indicates a direction (a linear motion axis direction) in which a slide member 130 or the guide rails 110 (see FIG. 3) move(s) in the linear motion guide mechanism 100. In a case where a portion that drives the slide member 130 in the linear motion guide mechanism 100 mainly includes, for example, a ball screw and a motor, the axial direction of the ball screw is the linear motion axis direction. Note that in the present embodiment, the form in which the linear motion guide mechanism 100 is provided in the body of the robot 10 as shown in FIG. 2A will be described as an example, but the form of the robot 10 and the linear motion guide mechanism 100 may be one shown in FIG. 2B or 2C.

As shown in FIG. 3, the linear motion guide mechanism 100 of the present embodiment includes two guide rails 110, four sliders 120, and the slide member 130. The guide rail 110 is a member that linearly guides the moving sliders 120 along the direction of extension of the guide rail 110. The two guide rails 110 are arranged with a constant space therebetween in a width direction (a y-direction) such that the directions (a z-direction) of extension of these two guide rails 110 are parallel with each other. As shown in FIG. 4, bearings 111 are provided at four points at the guide rail 110. Each bearing 111 is provided along the direction of extension of the guide rail 110.

Two sliders 120 are attached to each of the two guide rails 110 along the direction of extension thereof. As shown in FIG. 4, the slider 120 is a member having a portion whose cross-section is substantially in an inverted U-shape. Bearings 121 are provided at four points inside the slider 120. A plurality of rolling bodies 140 is fitted in an annular shape among the bearings 121 of the slider 120 and the bearings 111 of the guide rail 110.

The slide member 130 is a plate-shaped member to which the arm 11 (see FIG. 2A) of the robot 10, the tool 12 (see FIG. 2B) held on the arm 11 of the robot 10, or the robot 10 (see FIG. 2C) is to be attached. The slide member 130 is attached onto the four sliders 120. Specifically, the slide member 130 is attached onto the sliders 120 arranged at lower portions at four corners as viewed in plane, as shown in FIG. 5.

(Robot Control Device 20)

The robot control device 20 is a device that controls the robot 10 to perform a predetermined work. As shown in FIG. 1, the robot control device 20 includes a control unit 21, an operation input unit 22, a display unit 23, and a storage unit 24. The control unit 21 is a unit that controls movement of the robot 10 in an integrated manner, and includes a microprocessor having a central processing unit (CPU), a memory, etc. The control unit 21 is provided with a movement program in which each type of movement of the robot 10 is described. The control unit 21 creates, based on the given movement program, a movement command including a movement command for a servomotor that drives a linear motion axis, for example. The control unit 21 transmits the created movement command to the robot 10 via the signal cable (not shown), thereby controlling movement of the robot 10. Accordingly, the robot 10 executes the predetermined work.

The operation input unit 22 is a device that acquires various types of numerical data, operation instructions, movement instructions, etc. input by an operator of the robot 10. The operation input unit 22 includes, for example, a keyboard, a mouse, and a touch panel (not shown). Various types of numerical data etc. input via the operation input unit 22 are stored in the storage unit 24, for example.

The display unit 23 is a display device capable of displaying various types of data, messages, figures, etc. The storage unit 24 is a storage device that mainly stores various types of programs, data, etc. to be executed by the control unit 21. The storage unit 24 includes, for example, a semiconductor memory and a hard disk drive.

(Damage-Point Estimation Device 30)

The damage-point estimation device 30 is a device that extracts an estimated damage point of the linear motion guide mechanism 100 (see FIG. 2A) provided in the robot 10. In the damage-point estimation device 30, a data acquisition unit 31, an external-force and moment calculation unit 32, a load calculation unit 33, an equivalent load calculation unit 34, a safety factor calculation unit 35, and an estimated damage point extraction unit 36 as described later include microprocessors having central processing units (CPUs), memories, etc. The microprocessor reads and executes, e.g., a system or an application program stored in the memory, thereby executing later-described damage point estimation processing in cooperation with each piece of hardware.

The damage-point estimation device 30 includes the data acquisition unit 31, the external-force and moment calculation unit 32, the load calculation unit 33, the equivalent load calculation unit 34, the safety factor calculation unit 35, the estimated damage point extraction unit 36, a display unit (position information output unit) 37, and a storage unit 38. Note that some or all of the functions of the data acquisition unit 31, the external-force and moment calculation unit 32, the load calculation unit 33, the equivalent load calculation unit 34, the safety factor calculation unit 35, and the estimated damage point extraction unit 36 may be executed by the control unit 21 of the robot control device 20.

The data acquisition unit 31 acquires, via the robot control device 20, a physical parameter relating to movement of each axis of the robot 10 and an external force acting on the robot 10 at each time t when the movement program for the robot 10 is executed. Specifically, the data acquisition unit 31 acquires, as the physical parameter relating to movement of each axis of the robot 10, the position, speed, and acceleration of each axis of the robot 10. Note that the data acquisition unit 31 acquires, in addition to the above-described position, speed, and acceleration of each axis of the robot 10, the posture of each axis of the robot 10 and the amount of movement of each axis from a reference position, for example.

The movement program described herein is a program to be executed in the robot control device 20 or a simulation device (not shown) for the robot 10, the program causing the robot 10 to execute the predetermined work. Moreover, the external force acting on the robot 10 is a difference between a calculated torque value necessary for executing each type of movement of the robot 10 and an actual torque measurement value necessary when the robot 10 actually moves. The external force acting on the robot 10 can be calculated, for example, from a command value of current to be supplied to the servomotor (not shown) that drives each portion of the robot 10 and a current value when the servomotor actually operates.

The external-force and moment calculation unit 32 calculates an external force and a moment acting on a reference position $S_0$ of the slide member 130 at each time t based on the position, speed, and acceleration of each axis of the robot 10 acquired by the data acquisition unit 31, the external force acting on the robot 10 and acquired by the data acquisition unit 31, and a geometric parameter. Specifically, the external-force and moment calculation unit 32 calculates, as shown in FIG. 3, the external force in each direction of three coordinate axes x, y, z set perpendicular to each other at the reference position $S_0$ of the slide member 130 and the moment about each of the coordinate axes x, y, z. Note that the reference position $S_0$ of the slide member 130 is, for example, the position of the center of gravity of the slide member 130. Moreover, the geometric parameter is, for example, a parameter relating to the link length or arm weight of the robot 10.

The load calculation unit 33 calculates the load acting on each slider 120 at each time t based on the external force and the moment calculated by the external-force and moment calculation unit 32 and acting on the reference position $S_0$ and a distance $L_1$, $L_2$, $L_3$, $L_4$ (see FIG. 5) from the reference position $S_0$ of the slide member 130 to the position $S_1$, $S_2$, $S_3$, $S_4$ of the center of gravity of each slider 120. Specifically, the load calculation unit 33 calculates, as the load acting on each slider 120, a load $P_{Rn}$ in the height direction (an x-direction) of the slider 120 perpendicular to the direction of extension of the guide rail 110 and a load $P_{Tn}$ in the width direction (the y-direction) of the slider 120, as shown in FIG. 4. Note that "n" included in a reference character such as the loads $P_{Rn}$, $P_{Tn}$ indicates an arbitrary one of the four (n=1 to 4) sliders 120. That is, the load calculation unit 33 calculates the loads $P_{Rn}$, $P_{Tn}$ acting in two directions on each of the four sliders 120 at each time t.

The equivalent load calculation unit 34 calculates an equivalent load on each slider 120 at each time t based on the loads $P_{Rn}$, $P_{Tn}$ calculated by the load calculation unit 33 and acting on each slider 120 at each time t and an equivalent load calculation formula. Specifically, the equivalent load calculation unit 34 calculates the equivalent load $P_{En}$ on each slider 120 at each time t based on the loads $P_{Rn}$, $P_{Tn}$ calculated in two directions for each slider 120 and Formula (1) below which is the equivalent load calculation formula.

$$P_{En}=Kx \cdot P_{Rn}+Ky \cdot P_{Tn} \tag{1}$$

In Formula (1), Kx and Ky are equivalent factors unique to the linear motion guide mechanism 100.

The safety factor calculation unit (an estimated damage value calculation unit) 35 calculates the static safety factor (an estimated damage value) of each slider 120 at each time t based on the equivalent load $P_{En}$ calculated on each slider 120 at each time t by the equivalent load calculation unit 34 and a safety factor calculation formula (a safety estimation element). Specifically, the safety factor calculation unit 35 calculates the static safety factor $F_{Sn}$ of each slider 120 at each time t based on the equivalent load $P_{En}$ on each slider 120 at each time t and Formula (2) below which is the safety factor calculation formula.

$$F_{Sn}=C_0/P_{En} \tag{2}$$

In Formula (2), $C_0$ is a basic static rated load unique to the linear motion guide mechanism 100. The static safety factor $F_{Sn}$ calculated according to Formula (2) is in inverse proportion to the equivalent load $P_{En}$. That is, in Formula (2), the static safety factor $F_{Sn}$ decreases as the equivalent load $P_{En}$ increases. Moreover, in Formula (2), the static safety factor $F_{Sn}$ increases as the equivalent load $P_{En}$ decreases.

The estimated damage point extraction unit 36 extracts a point (hereinafter also referred to as an "estimated damage point") susceptible to damage in the linear motion guide mechanism 100 based on the static safety factor $F_{Sn}$ of each slider 120 calculated at each time t by the safety factor calculation unit 35 and the position (see FIG. 3) of each slider 120 on the guide rail 110 at each time t. That is, the estimated damage point extraction unit 36 extracts, as the estimated damage point, a point with a low static safety factor $F_{Sn}$ on the guide rail 110.

Figure 6:
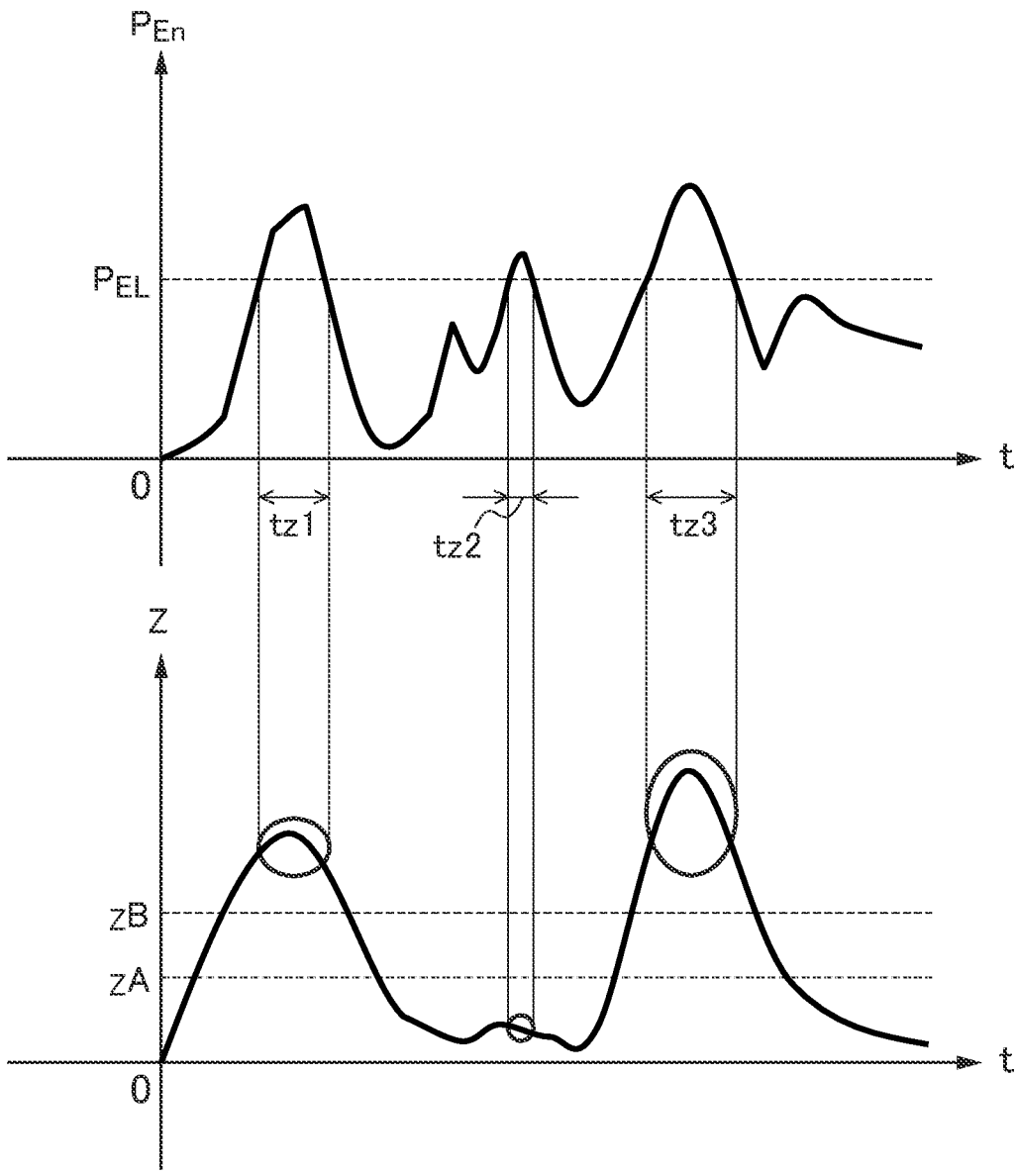
FIG. 6 is a graph for describing processing of extracting an estimated damage point of the linear motion guide mechanism 100 by an estimated damage point extraction unit 36.

Next, a specific example of processing of extracting the estimated damage point of the linear motion guide mechanism 100 by the estimated damage point extraction unit 36 will be described. FIG. 6 is a graph for describing the processing of extracting the estimated damage point of the linear motion guide mechanism 100 by the estimated damage point extraction unit 36. FIG. 6 shows the processing performed for an arbitrary one of the four sliders 120 (see FIG. 5). FIG. 6 shows, on the upper side, a graph of a relationship between the time t (the horizontal axis) when the movement program for the robot 10 is executed and the equivalent load $P_{En}$ (the vertical axis) on the slider 120 at each time t. The equivalent load $P_{En}$ on the slider 120 at each time t is calculated by the equivalent load calculation unit 34. FIG. 6 shows, on the lower side, a graph of a relationship between the time t (the horizontal axis) when the movement program for the robot 10 is executed and the position (the vertical axis) of the slider 120 on the guide rail 110 in the z-direction. The position of the slider 120 can be acquired, for example, from the movement program executed by the robot control device 20. Moreover, the position of the slider 120 indicated by the vertical axis (z) indicates a distance by which the slider 120 has moved from a reference position (0) on the guide rail 110. The time axis for the time t is coincident between the upper graph and the lower graph shown in FIG. 6.

As shown in the upper graph in FIG. 6, when the movement program is executed, the equivalent load $P_{En}$ on the slider 120 changes from moment to moment according to the position on the guide rail 110. The estimated damage point extraction unit 36 extracts, based on a reference value $P_{EL}$ of the equivalent load $P_{En}$, a time t at which the equivalent load $P_{En}$ reaches the reference value $P_{EL}$ or more. The reference value $P_{EL}$ of the equivalent load $P_{En}$ is a threshold calculated based on the basic static rated load $C_0$. In a time period in which the equivalent load $P_{En}$ is the reference value $P_{EL}$ or more, the static safety factor $F_{Sn}$ is low. Thus, in such a time period, damage is easily caused. On the other hand, in a time period in which the equivalent load $P_{En}$ is less than the reference value $P_{EL}$, the static safety factor $F_{Sn}$ is high. Thus, in such a time period, damage is less likely to be caused. In the upper graph in FIG. 6, three time periods tz1 to tz3 are extracted, in which the equivalent load $P_{En}$ is the reference value $P_{EL}$ or more.

Based on the above-described time periods tz1 to tz3 and the lower graph in FIG. 6, the estimated damage point extraction unit 36 extracts, as the estimated damage points, the positions (the positions on the guide rail 110 in the z-direction) of the slider 120 corresponding to the time periods tz1 to tz3 in which the equivalent load $P_{En}$ is the reference value $P_{EL}$ or more. In the example shown in FIG. 6, two points at which the slider 120 is farthest from the reference position (0) and one point at which the slider 120 is relatively close to the reference position are extracted as the estimated damage points (important inspection points).

Moreover, the estimated damage point extraction unit 36 calculates, as recommended slider position data, such a position on the guide rail 110 that the extracted estimated damage point and the slide member 130 do not overlap with each other. In the example shown in FIG. 6, a position corresponding to a range zA to zB is the recommended slider position data. For example, the length L1 of an area of the guide rail 110 in the z-direction other than the extracted estimated damage point and the length L2 (the length in the z-direction as shown in FIG. 3) of the slide member 130 are compared with each other. In a case where there is an area where L1≥L2, the recommended slider position data can be calculated in such a manner that the positions of the start and end points of such an area from the reference position are obtained.

The estimated damage point extraction unit 36 stores, in the storage unit 38 (described later), estimated damage point data regarding the extracted estimated damage point, axis position data regarding the position of each axis (all axes including the linear motion axis) of the robot 10 at the extracted estimated damage point, and the recommended slider position data indicating the position at which the extracted estimated damage point and the slide member 130 do not overlap with each other. Then, the estimated damage point extraction unit 36 displays, on the display unit 37 (described later), the estimated damage point data, the axis position data, and the recommended slider position data based on an operator's instruction input via the robot control device 20 (see FIG. 1).

The display unit 37 is a display device capable of displaying various types of data, messages, figures, etc. The display unit 37 displays, as position information, the estimated damage point data, the axis position data, and the recommended slider position data. The storage unit 38 is a storage device that stores various types of programs, data, etc. to be executed in the data acquisition unit 31, the external-force and moment calculation unit 32, the load calculation unit 33, the equivalent load calculation unit 34, the safety factor calculation unit 35, and the estimated damage point extraction unit 36 as described above. The storage unit 38 includes, for example, a semiconductor memory and a hard disk drive.

Figure 7:
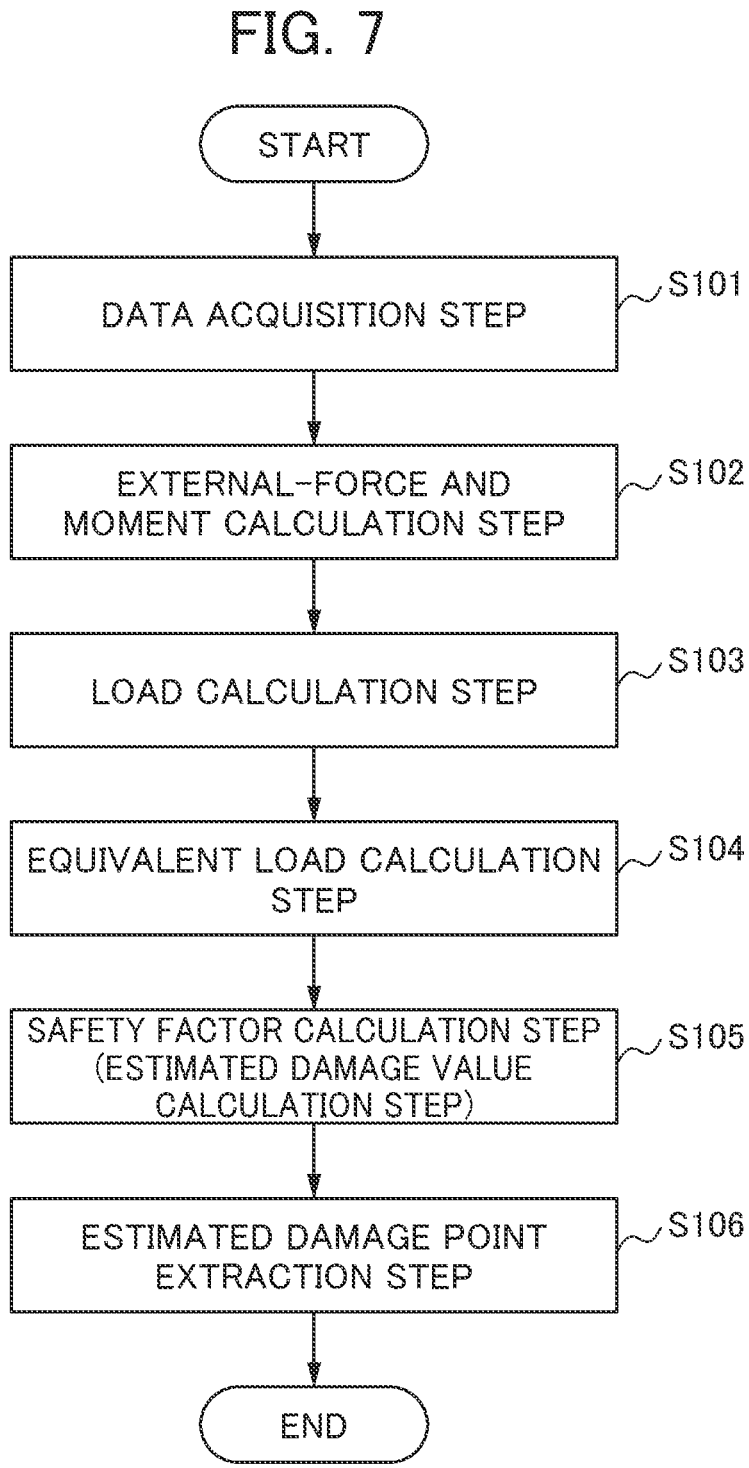
FIG. 7 is a flowchart showing steps of the processing of an estimated damage point extraction program executed in the damage-point estimation device 30.

Next, a specific example of processing of extracting the estimated damage point of the linear motion guide mechanism 100 in the damage-point estimation device 30 of the first embodiment will be described. FIG. 7 is a flowchart showing steps of the processing of an estimated damage point extraction program executed in the damage-point estimation device 30. The processing of the estimated damage point extraction program shown in FIG. 7 is executed in synchronization with the movement program for the robot 10.

In Step S101 of FIG. 7, the data acquisition unit 31 acquires the physical parameter (the position, speed, and acceleration of each axis of the robot 10) relating to movement of each axis of the robot 10 and the external force acting on the robot 10 at each time t when the movement program for the robot 10 is executed (a data acquisition step).

In Step S102, the external-force and moment calculation unit 32 calculates the external force and the moment acting on the reference position $S_0$ of the slide member 130 at each time t based on the position, speed, and acceleration of each axis of the robot 10 acquired by the data acquisition unit 31, the external force acting on the robot 10 and acquired by the data acquisition unit 31, and the geometric parameter (an external-force and moment calculation step).

In Step S103, the load calculation unit 33 calculates the load acting on each slider 120 at each time t based on the external force and the moment calculated by the external-force and moment calculation unit 32 and acting on the reference position $S_0$ and the distance $L_1$ to $L_4$ (see FIG. 5) from the reference position $S_0$ of the slide member 130 to the position $S_1$ to $S_4$ of the center of gravity of each slider 120 (a load calculation step).

In Step S104, the equivalent load calculation unit 34 calculates the equivalent load on each slider 120 at each time t based on the loads $P_{Rn}$, $P_{Tn}$ calculated by the load calculation unit 33 and acting on each slider 120 at each time t and the equivalent load calculation formula (an equivalent load calculation step).

In Step S105, the safety factor calculation unit 35 calculate the static safety factor of each slider 120 at each time t based on the equivalent load P En calculated on each slider 120 at each time t by the equivalent load calculation unit 34 and the safety factor calculation formula (a safety factor calculation step: an estimated damage value calculation step).

In Step S106, the estimated damage point extraction unit 36 extracts the estimated damage point of the linear motion guide mechanism 100 based on the static safety factor $F_{Sn}$ of each slider 120 calculated at each time t by the safety factor calculation unit 35 and the position (see FIG. 3) of each slider 120 on the guide rail 110 at each time t (an estimated damage point extraction step). After the end of Step S106, the estimated damage point extraction unit 36 stores, in the storage unit 38, the estimated damage point data regarding the extracted estimated damage point and the axis position data regarding the position of each axis of the robot 10 at the extracted estimated damage point, and the processing of the present flowchart ends. Note that after the end of the processing in Step S106, the estimated damage point data, the axis position data, and the recommended slider position data may be displayed on the display unit 37 based on an operator's instruction, for example.

According to the above-described damage-point estimation device 30 of the first embodiment, the following advantageous effects are produced, for example. In the damage-point estimation device 30 of the first embodiment, the position and degree of the load acting on the linear motion guide mechanism 100 when the position of the center of gravity changes due to a change in the posture of the robot 10 or when the load changes according to the movement pattern upon execution of the movement program for the robot 10 are calculated, and the estimated damage point is extracted using the position and degree of the load. Thus, the estimated damage point of the linear motion guide mechanism 100 provided in the robot 10 or the linear motion guide mechanism 100 cooperating with the robot 10 can be more accurately extracted.

According to the damage-point estimation device 30 of the first embodiment, the point susceptible to damage can be more accurately extracted, and therefore, the important inspection points in the linear motion guide mechanism 100 can be easily narrowed down. Thus, the number of steps necessary for inspection of the linear motion guide mechanism 100 can be reducing using the damage-point estimation device 30 of the first embodiment.

According to the damage-point estimation device 30 of the first embodiment, the position, at which the extracted estimated damage point and the slide member 130 do not overlap with each other, on the guide rail 110 is calculated as the recommended slider position data. Thus, for example, at the end of the movement program, the slide member 130 can be moved to the position at which the slide member 130 does not overlap with the estimated damage point, based on the calculated recommended slider position data. Consequently, the number of steps of moving, upon inspection, the slide member 130 to the position at which the slide member 130 does not overlap with the estimated damage point can be reduced.

According to the damage-point estimation device 30 of the first embodiment, the estimated damage point data, the axis position data, and the recommended slider position data extracted or calculated by the estimated damage point extraction unit 36 are displayed on the display unit 37, and therefore, an operator can easily and intuitively grasp the important inspection point on the guide rail 110 or the position of the slide member 130 on the guide rails 110.

According to the damage-point estimation device 30 of the first embodiment, a change in the position of the center of gravity due to a change in the posture of the robot 10 or a change in the load according to the movement pattern can match the point susceptible to damage in the linear motion guide mechanism 100, and therefore, the position and movement of the robot 10 easily causing damage when the movement program is executed can be extracted. Thus, when a new movement program is created or an attempt is made to build a robot system, posture and movement settings easily causing damage can be avoided, and therefore, damage of the linear motion guide mechanism 100 can be reduced in advance.

Second Embodiment

Figure 8:
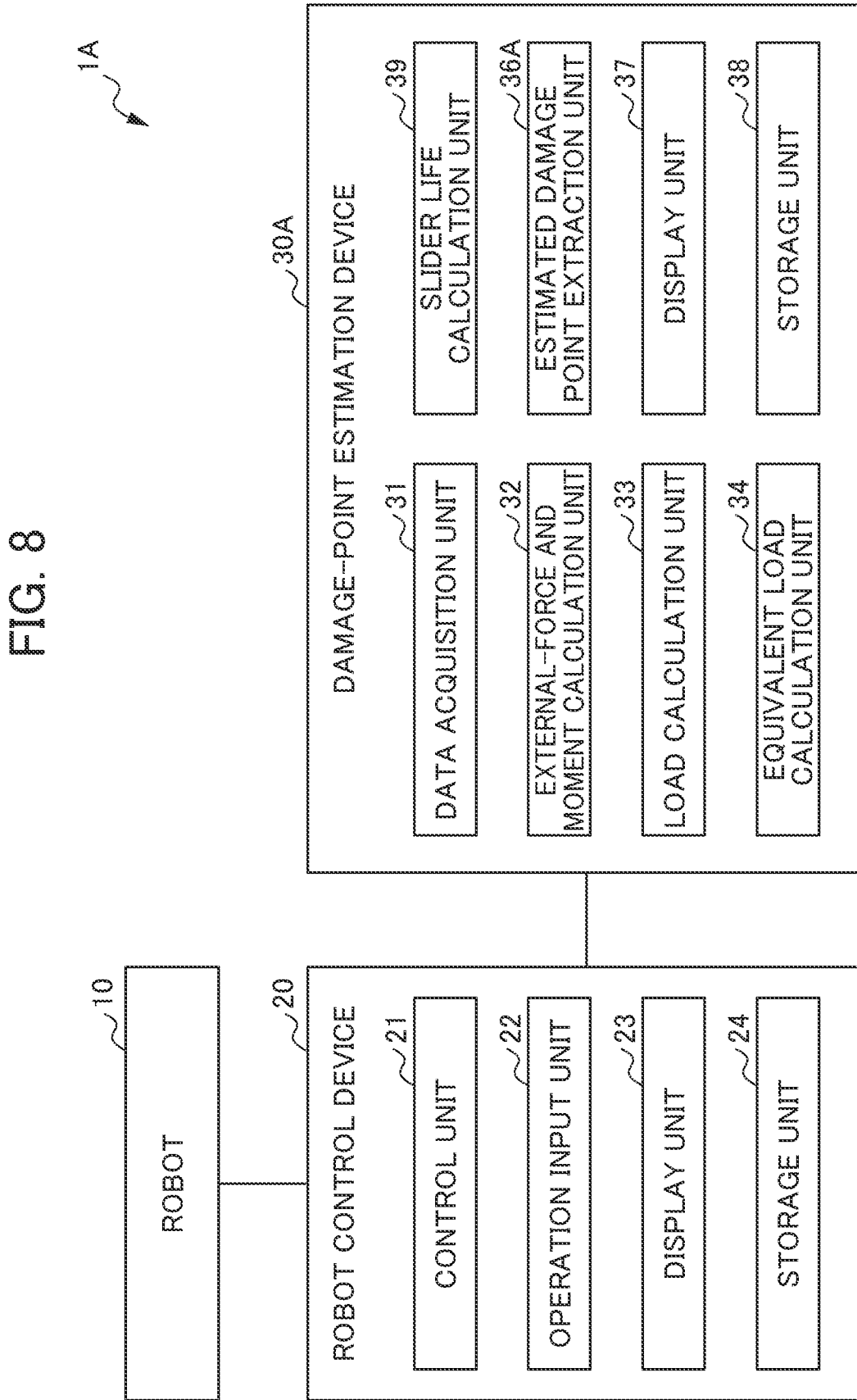
FIG. 8 is an entire configuration diagram of a robot system 1A of a second embodiment.
Figure 9:
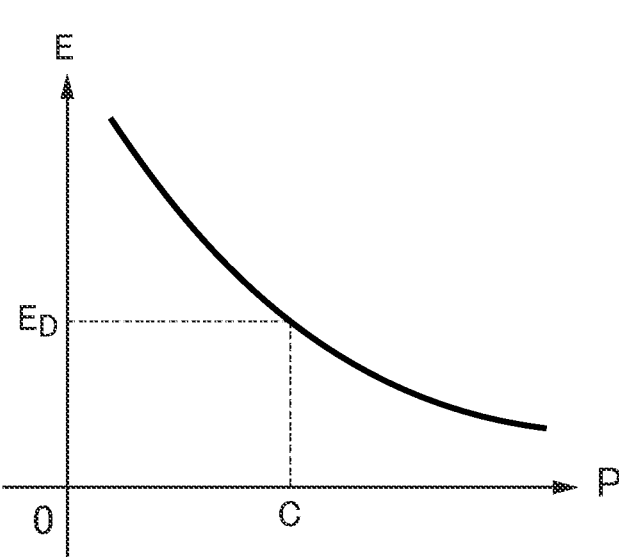
FIG. 9 is a graph for describing a relationship between a load P acting on a slider 120 and the life E of the slider 120.

In the second embodiment, only configuration differences from the first embodiment will be shown in the figures. Moreover, in the description and figures of the second embodiment, the same reference numerals as those of the first embodiment are used to represent members etc. equivalent to those of the first embodiment, and overlapping description thereof is omitted. FIG. 8 is an entire configuration diagram of the robot system 1A of the second embodiment. FIG. 9 is a graph for describing a relationship between a load P acting on a slider 120 and the life E of the slider 120.

The robot system 1A shown in FIG. 8 is different from that of the first embodiment in the configuration of a damage-point estimation device 30A. Specifically, the damage-point estimation device 30A of the second embodiment includes a slider life calculation unit 39 instead of the safety factor calculation unit 35 of the damage-point estimation device 30 of the first embodiment, and includes an estimated damage point extraction unit 36A instead of the estimated damage point extraction unit 36 of the damage-point estimation device 30 of the first embodiment.

The slider life calculation unit (an estimated damage value calculation unit) 39 calculates the life (an estimated damage value) of each slider 120 at each time t based on an equivalent load $P_{En}$ calculated on each slider 120 at each time t by an equivalent load calculation unit 34, a basic dynamic rated load (a safety estimation element) C unique to a linear motion guide mechanism 100, and a slider life calculation formula (a safety estimation element).

The basic dynamic rated load C unique to the linear motion guide mechanism 100 indicates such a load with a constant degree in a constant direction that when a group of the same linear motion guide mechanisms 100 is individually operated under the same conditions, 90% of these linear motion guide mechanisms 100 show no material damage due to rolling fatigue and can move by a preset distance $E_D$. The preset distance $E_D$ is, for example, 50 km when a ball is used as a rolling body 140 (see FIG. 4), and is 100 km when a roller is used as the rolling body 140.

The load-life curve shown in FIG. 9 indicates a correlation between the load P acting on the slider 120 and the life E. As shown in FIG. 9, the basic dynamic rated load C can be specified from a position, which corresponds to the distance $E_D$ (e.g., 50 km), on the load-life curve. Note that the life E of the slider 120 is indicated by such a total movement distance (km) that when a group of the same linear motion guide mechanisms 100 is individually operated under the same conditions, 90% of these linear motion guide mechanisms 100 can move without flaking (separation of scaly flakes from a metal surface).

As the slider life calculation formula, Formula (3) or Formula (4) below can be used, for example.

$$E_B = (\alpha \times C/P_{En})^3 \times 50 \tag{3}$$

$$E_R = (\alpha \times C/P_{En})^{10/3} \times 50 \tag{4}$$

In Formula (3), $E_B$ is the life of the slider when the ball is used as the rolling body 140. In Formula (4), $E_R$ is the life of the slider when the roller is used as the rolling body 140. In Formulae (3) and (4), a is a factor taking conditions for use of the linear motion guide mechanism 100 into consideration.

Figure 10:
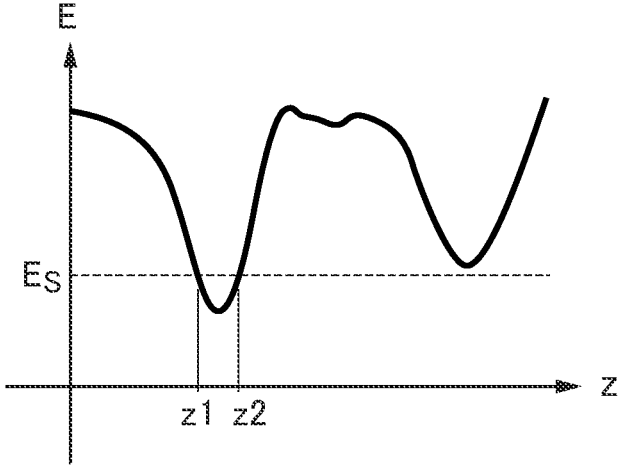
FIG. 10 is a graph for describing processing of extracting an estimated damage point of a linear motion guide mechanism 100 by an estimated damage point extraction unit 36A.

The estimated damage point extraction unit 36A extracts an estimated damage point of the linear motion guide mechanism 100 based on the life E ($E_B$ or $E_R$) of the slider calculated at each time t by the slider life calculation unit 39 and the position (see FIG. 3) of each slider 120 on a guide rail 110 at each time t. FIG. 10 is a graph for describing processing of extracting the estimated damage point of the linear motion guide mechanism 100 by the estimated damage point extraction unit 36A. FIG. 10 shows the processing performed for an arbitrary one of four sliders 120 (see FIG. 5). FIG. 10 is a graph showing a relationship between the position (the horizontal axis) of the slider 120 on the guide rail 110 in the z-direction and the life E of the slider 120. The estimated damage point extraction unit 36A extracts, based on a life reference value Es, a position (a position on the guide rail 110 in the z-direction) at which the life E of the slider 120 is less than the reference value Es. In the example shown in FIG. 10, an area z1 to z2 on the guide rail 110 is extracted as the estimated damage point (an important inspection point).

The position at which the life E of the slider 120 is less than the reference value Es is assumed as a position at which the life is short and damage is easily caused. Thus, the estimated damage point extraction unit 36A of the second embodiment extracts the position at which the life E of the slider 120 is less than the reference value Es, so that the estimated damage point of the linear motion guide mechanism 100 provided in a robot 10 or the linear motion guide mechanism 100 cooperating with the robot 10 can be more accurately extracted.

Next, a specific example of processing of extracting the estimated damage point of the linear motion guide mechanism 100 in the damage-point estimation device 30A of the second embodiment will be described. FIG. 11 is a flowchart showing steps of the processing of an estimated damage point extraction program executed in the damage-point estimation device 30A. The processing of the estimated damage point extraction program shown in FIG. 11 is executed in synchronization with a movement program for the robot 10. Note that the estimated damage point extraction program shown in FIG. 11 is different from the estimated damage point extraction program of the first embodiment. However, in the flowchart shown in FIG. 11, the processing in Steps S201 to S204 is substantially the same as the processing in Steps S101 to S104 of the flowchart described in the first embodiment (see FIG. 7), and therefore, description thereof is omitted.

In Step S205 shown in FIG. 11, the slider life calculation unit 39 calculates the life E of each slider 120 at each time t based on the equivalent load $P_{En}$ calculated on each slider 120 at each time t by the equivalent load calculation unit 34, the basic dynamic rated load C unique to the linear motion guide mechanism 100, and the slider life calculation formula (a slider life calculation step: an estimated damage value calculation step).

In Step S206 shown in FIG. 11, the estimated damage point extraction unit 36A extracts the estimated damage point of the linear motion guide mechanism 100 based on the life E of each slider 120 calculated at each time t by the slider life calculation unit 39 and the position (see FIG. 3) of each slider 120 on the guide rail 110 at each time t (an estimated damage point extraction step). After the end of Step S206, the estimated damage point extraction unit 36A stores, in a storage unit 38, estimated damage point data regarding the extracted estimated damage point and axis position data regarding the position of each axis of the robot 10 at the extracted estimated damage point, and the processing of the present flowchart ends. Note that after the end of the processing in Step S206, the estimated damage point data, the axis position data, and recommended slider position data may be displayed on a display unit 37 based on an operator's instruction, for example.

(Modifications)

In the embodiment, the example where the estimated damage point data, the axis position data, and the recommended slider position data extracted or calculated by the estimated damage point extraction unit 36 (or 36A) are displayed on the display unit 37 has been described, but only data specified by the operator may be displayed on the display unit 37. Alternatively, the estimated damage point data, the axis position data, and the recommended slider position data may be transmitted to the robot control device 20, and may be displayed on the display unit 23 of the robot control device 20. In the embodiment, the position information output unit that outputs, as the position information, the estimated damage point data, the axis position data, and the recommended slider position data is not limited to the display unit 37 which is the display device, and for example, may be a printing device, a projector device, or an audio output device.

In the embodiment, the example where the damage-point estimation device 30 (or 30A) is connected to the robot control device 20 has been described, but the damage-point estimation device 30 (or 30A) may be connected to the simulation device not connected to the robot 10. With this configuration, the estimated damage point data and the axis position data extracted or calculated by the estimated damage point extraction unit 36 (or 36A) can be utilized when the simulation device simulates a change in the position of the center of gravity due to a change in the posture of the robot 10 or a change in the load according to the movement pattern.

EXPLANATION OF REFERENCE NUMERALS

1, 1A: Robot System, 10: Robot, 11: Arm, 12: Tool, 20: Robot Control Device, 21: Control Unit, 22: Operation Input Unit, 23: Display Unit, 24: Storage Unit, 30, 30A: Damage-Point Estimation Device, 31: Data Acquisition Unit, 32: an external-force and Moment Calculation Unit, 33: Load Calculation Unit, 34: Equivalent Load Calculation Unit, 35: Safety Factor Calculation Unit (Estimated Damage Value Calculation Unit), 36, 36A: Estimated Damage Point Extraction Unit, 37: Display Unit (Position Information Output Unit), 39: Slider Life Calculation Unit (Estimated Damage Value Calculation Unit), 100: Linear Motion Guide Mechanism, 110: Guide Rail, 120: Slider, 130: Slide Member

The invention claimed is:

1. A damage-point estimation device used to estimate a damage point of a linear motion guide mechanism, which includes at least a slider linearly movably provided on a guide rail and a slide member provided on the slider, for a robot, which is controlled by a robot control device that is communicably connected with the damage-point estimation device, the damage-point estimation device comprising:

a central processing unit (CPU); and a memory, wherein the CPU reads a computer program stored in the memory and instructs the damage-point estimation device steps including:

acquiring a physical parameter relating to a position, speed, and acceleration of each axis of the robot and an external force acting on the robot at each time when a movement program for the robot is executed;

calculating an external force and a moment acting on a reference position of the slide member at each time based on the physical parameter, the external force acting on the robot, and a geometric parameter relating to a link length and arm weight of the robot;

calculating a load acting on the slider at each time based on the external force and the moment that act on the reference position and a distance from the reference position of the slide member to a position of a center of gravity of the slider;

calculating an equivalent load on the slider at each time based on the load that acts on the slider at each time and an equivalent load calculation formula;

calculating an estimated damage value of the slider at each time based on the equivalent load calculated on the slider at each time and a safety estimation element; and extracting an estimated damage point of the linear motion guide mechanism based on the estimated damage value of the slider calculated at each time and a position of the slider on the guide rail at each time, wherein the damage-point estimation device is configured to communicate with the robot control device to receive electrical signals with which the CPU acquires the physical parameter and the external force acting on the robot, and wherein the estimated damage point is extracted in collaboration with calculations based on the speed and acceleration of each axis of the robot.

2. The damage-point estimation device according to claim 1, wherein a static safety factor of the slider at each time is calculated as the estimated damage value based on the equivalent load calculated on the slider at each time and a safety factor calculation formula which is the safety estimation element, and the estimated damage point of the linear motion guide mechanism is extracted based on the static safety factor of the slider calculated at each time and the position of the slider on the guide rail at each time.

3. The damage-point estimation device according to claim 1, wherein a life of the slider at each time is calculated as the estimated damage value based on the equivalent load calculated on the slider at each time, a basic dynamic rated load, which is the safety estimation element, unique to the linear motion guide mechanism, and a slider life calculation formula which is the safety estimation element, and the estimated damage point of the linear motion guide mechanism is extracted based on the life of the slider calculated at each time and the position of the slider on the guide rail at each time.

4. The damage-point estimation device according to claim 1, wherein such a position on the guide rail that the estimated damage point and the slide member do not overlap with each other is calculated.

5. The damage-point estimation device according to claim 4, wherein the steps further include outputting, as position information, at least one selected from the estimated damage point, a position of each axis of the robot at the estimated damage point, or the position at which the estimated damage point and the slide member do not overlap with each other.

6. The damage-point estimation device according to claim 1, wherein an external force in each direction of three coordinate axes set perpendicular to each other at the reference position of the slide member and a moment about each of the coordinate axes are calculated as the external force and the moment acting on the reference position of the slide member at each time.

7. The damage-point estimation device according to claim 1, wherein a load $P_{Rn}$ in a height direction of the slider perpendicular to a longitudinal direction of the guide rail and a load $P_{Tn}$ in a width direction of the slider are calculated as the load acting on the slider.

8. The damage-point estimation device according to claim 7, wherein the equivalent load calculation formula used for calculating the equivalent load on the slider at each time is an equivalent load $P_{En}=Kx \cdot P_{Rn}+Ky \cdot P_{Tn}$, where Kx and Ky are equivalent factors unique to the linear motion guide mechanism.

9. The damage-point estimation device according to claim 2, wherein the safety factor calculation formula used for calculating the static safety factor of the slider at each time is a static safety factor $F_{Sn}=C_0/P_{En}$, where $C_0$ is a basic static rated load unique to the linear motion guide mechanism.

10. The damage-point estimation device according to claim 9, wherein a time period in which the equivalent load $P_{En}$ calculated on the slider at each time is less than a reference value calculated based on the static safety factor $F_{Sn}$ is extracted and a position of the slider corresponding to the extracted time period is extracted as the estimated damage point of the linear motion guide mechanism.

11. A damage-point estimation method for estimating an estimated damage point of a linear motion guide mechanism which includes at least a slider linearly movably provided on a guide rail and a slide member provided on the slider and is provided in a robot or a linear motion guide mechanism cooperating with the robot, the method comprising the steps of:

acquiring a physical parameter relating to a position, speed, and acceleration of each axis of the robot and an external force acting on the robot at each time when a movement program for the robot is executed;

calculating an external force and a moment acting on a reference position of the slide member at each time based on the physical parameter, the external force acting on the robot, and a geometric parameter relating to a link length and arm weight of the robot;

calculating a load acting on the slider at each time based on the external force and the moment that act on the reference position and a distance from the reference position of the slide member to a position of a center of gravity of the slider;

calculating an equivalent load on the slider at each time based on the load that acts on the slider at each time and an equivalent load calculation formula;

calculating an estimated damage value of the slider at each time based on the equivalent load calculated on the slider at each time and a safety estimation element; and extracting the estimated damage point of the linear motion guide mechanism based on the estimated damage value of the slider calculated at each time and a position of the slider on the guide rail at each time, wherein the damage-point estimation method is configured to communicate with a robot control device of the robot to receive electrical signals, with which the physical parameter and the external force acting on the robot are acquired, and wherein the estimated damage point is extracted in collaboration with calculations based on the speed and acceleration of each axis of the robot.

* * * * *